United States Patent [19]

Grosse-Puppendahl et al.

[11] Patent Number: 5,132,182

[45] Date of Patent: Jul. 21, 1992

[54] PROCESS FOR CHEMICALLY BONDING MOLDING COMPOSITIONS BASED ON ALIPHATIC POLYAMIDES TO RUBBERS CONTAINING CARBOXYL GROUPS AND THE MATERIALS PRODUCED BY THIS PROCESS

[75] Inventors: Thomas Grosse-Puppendahl, Haltern; Hans Jadamus; Klaus-Peter Richter, both of Marl; Christian Gerth, Haltern, all of Fed. Rep. of Germany

[73] Assignee: Huels Aktiengesellschaft, Marl, Fed. Rep. of Germany

[21] Appl. No.: 657,953

[22] Filed: Feb. 21, 1991

Related U.S. Application Data

[63] Continuation of Ser. No. 346,747, May 3, 1989, abandoned.

[30] Foreign Application Priority Data

May 28, 1988 [DE] Fed. Rep. of Germany ....... 3818151

[51] Int. Cl.$^5$ .................. B32B 27/08; B32B 31/26
[52] U.S. Cl. .................. 428/475.8; 156/307.7; 427/393.5; 428/476.3

[56] References Cited

U.S. PATENT DOCUMENTS

| | | | |
|---|---|---|---|
| 4,401,327 | 8/1983 | Caines | 427/393.5 |
| 4,559,688 | 12/1985 | Abu-Isa et al. | 427/393.5 |
| 4,684,578 | 8/1987 | Inoue et al. | 428/476.3 |

Primary Examiner—John J. Gallagher
Attorney, Agent, or Firm—Oblon, Spivak, McClelland, Maier & Neustadt

[57] ABSTRACT

A process for bonding a polyamide containing thermoplastic material and a rubber, comprising covulcanizing, in the presence of a vulcanization system, a thermoplastic component which contains at least 30% by wt. of an aliphatic polyamide and a rubber composition which, based on 100 parts by weight of a carboxyl group-containing rubber, contains 100-300 parts by wt. of fillers, and 1-10 parts by wt. of peroxidic vulcanizing agents.

12 Claims, No Drawings

PROCESS FOR CHEMICALLY BONDING MOLDING COMPOSITIONS BASED ON ALIPHATIC POLYAMIDES TO RUBBERS CONTAINING CARBOXYL GROUPS AND THE MATERIALS PRODUCED BY THIS PROCESS

This application is a continuation of application Ser. No. 346,747, filed on May 3, 1989, now abandoned.

BACKGROUND OF THE INVENTION

1. Field of the Invention

The present invention relates to a process for firmly bonding thermoplastic molding compositions based on aliphatic polyamides to functionalized rubbers and to the materials obtained by this process.

2. Description of the Background

Composite materials made from thermoplastically rigid and rubber-elastic molding materials are usually assembled by adhesion, screwing together, rivetting or mechanical gripping. Recently, interesting processes have been developed for chemically bonding molding compositions based on poly(phenylene ethers) (PPE) and certain rubbers which contain double bonds and which can be vulcanized using sulfur or a peroxide (cf. DE-OS 3,602,705 and German Patent Application P 37 39 891.0). The bonding strengths achieved are considerable; however, the resistance of the PPE molding compositions to solvents and the stability of the compositions to weathering are unsatisfactory.

In principle, it is conceiveable that other thermoplastic molding compositions which are known to meet these requirements better could be employed in this process. However, it has been shown that adequate adhesion between materials cannot be achieved under the process conditions recognized as being essential when using the likes of nylon polyamides (PA), which are known to be stable to solvents. A need therefore continues to exist for a method of bonding polyamides and rubbers and achieve, as a result, a composite exhibiting good stability to solvents and weathering as well as adequate bond strength.

SUMMARY OF THE INVENTION

Accordingly, one object of the present invention is to provide a solvent and weather resistant bond between a thermoplastic molding composition containing a polyamide and a rubber material.

Briefly, this object and other objects of the present invention as hereinafter will become more readily apparent can be attained in a method of chemically bonding a composite material by contacting, in the presence of a vulcanization system, a thermoplastic component which contains at least 30% by wt. of an aliphatic polyamide and a rubber composition which, based on 100 parts by weight of a carboxyl group-containing rubber, contains 100-300 parts by wt. of fillers, and 1-10 parts by wt. of peroxidic vulcanizing agents, and vulcanizing the rubber layer thereby achieving firm bonding of the contacting thermoplastic and rubber.

DETAILED DESCRIPTION OF THE PREFERRED EMBODIMENTS

The rubber component of the present composite is preferably a EP(D)M or NBR rubber. The thermoplastic polyamide employed is preferably of nylon such as PA 46, PA 6, PA 66, PA 12, PA 612, PA 11 and/or PA 610, with $NH_2$ terminal groups predominating. Up to 70 percent of the polyamide may be replaced by poly(phenylene ether). The bonding of the thermoplastic and the rubber by vulcanization of the rubber is preferably carried out at temperatures between 140 and 200° C. in 2 to 30 minutes, in particular at temperatures between 150 and 180° C. in 5 to 20 minutes.

The process of the invention is distinguished by achieving the following advantages:

i) Not only polyamides, but also PA/PPE can be employed in the present molding composition.

ii) Bonding between thermoplastic and rubber advantageously is complete in a few minutes.

iii) The PA molding compositions and rubbers employed in the present composite system are stable to solvents, petroleum, and the like and can also be employed without difficulties for exterior applications.

iv) The bond between thermoplastic and rubber is so strong that cohesive fracture usually occurs in the rubber when tested, but not separation at the phase interface.

The PA molding component, as it is based upon a polyamide material optionally containing a poly(phenylene ether) (PPE) and additives, is described in detail as follows:

The polyamide ingredient of the invention contains —CO—NH— bonds in its main chain. All polyamides which can be melted by heating are suitable. Specific examples of suitable nylon polyamides include PA 46, PA 6, PA 66, PA 12, PA 612, PA 11 and PA 610. The polyamides are prepared in a known manner by polycondensation. The ratio between the COOH and $NH_2$ groups in the polyamide is preferably 1:x where $100 > x > 1$.

Suitable molding compositions which contain a poly(phenylene ether) in addition to the polyamide are produced by melting and mixing at least 30 percent by weight of a polyamide with up to 70 percent by weight of a poly(phenylene ether). Molding compositions based on polyamides and poly(phenylene ethers) are described, for example, in DE-OS 3,027,104 and 3,518,278, in EP-OS 0,147,874 and in European Patent 0,024,120. It is known to those skilled in the art that these molding compositions usually contain a compatibility promoter.

The PA molding compositions optionally contain further additives such as reinforcing agents, flameproofing agents, stabilizers, processing auxiliaries, blowing agents, metal fibers, carbon black, graphite and metal leaf, titanium dioxide, colored pigments and zinc sulfide. The amount of reinforcing agent in the thermoplastic molding composition can be as high as 50%, while the amount of the flameproofing agent can be as high as to 20%. All other additives together are present in an amount to 10%, in each case based on the total molding composition.

The rubber component employed in the process of the invention contains a rubber containing carboxyl groups, which is produced, for example, in a known manner by carboxylation using unsaturated acids or acid derivatives such as, for example, maleic acid or maleic anhydride as described in, for example, U.S. Pat. No. 4,010,223. It is also possible to produce these rubbers by copolymerization using unsaturated acids such as, for example, acrylic acid. In principle, all rubbers containing carboxyl groups which can be produced in a known manner are suitable. However, carboxylated EP(D)M and NBR rubbers are preferred.

EP(D)M rubbers are rubbers which are produced in a known manner by polymerization of a mixture of ethylene and propylene and optionally a diene in the presence of a Ziegler-Natta catalyst, such as, for example, diethylaluminum chloride. The EPDM rubber is produced, for example, by polymerization of a mixture of more than 25% of ethylene, more than 25% of propylene and 1 to 10%, in particular 1 to 3%, of a non-conjugated diene such as bicyclo(2,2,1)heptadiene, 1,4-hexadiene, dicyclopentadiene and, in particular, 5-ethylidenenorbornene.

Suitable EPM rubbers are produced, for example, by EXXON under the name EXXELOR VA 1803 (registered trademark). A suitable EPDM rubber is, for example, MSA-modified BUNA ® AP (product name: Experimental product X 4496) from Bunawerke Huels GmbH.

Nitrile rubbers (NBR) are produced by copolymerization of 50 to 80 percent by weight of butadiene and correspondingly 50 to 20 per cent by weight of acrylonitrile. A particular modification is formed by the nitrile rubbers containing carboxyl groups. These are copolymers of butadiene, acrylonitrile and acrylic acid, methacrylic acid or sorbic acid.

The NBR vulcanizates are distinguished by high tensile strengths, good elasticity and very good abrasion resistance. The oil and solvent resistance which is typical of nitrile rubbers is not impaired by the addition of unsaturated acid derivatives during polymerization. Suitable NBR rubbers are produced, for example, by Goodyear Tire & Rubber Company, Akron, Ohio, USA, under the name CHEMIGUM ® NX 775 and by BF Goodrich, NV, Arnhem, The Netherlands, under the trade name HYCAR ® 1472.

Suitable fillers for the rubber component include all substances which are customarily employed in EP(D)M and NBR rubbers, such as, for example, carbon black, silica, silicates, calcium carbonate, zinc oxide and stearic acid. Suitable plasticizers include, in particular, naphthenic oils in an amount of, preferably, up to 50 parts by weight, based on 100 parts by weight of rubber.

Suitable peroxidic vulcanizing agents for the rubber component include the peroxides which are known to those skilled in the art, such as, for example, 2,5-dimethyl-2,5-bis(tert-butylperoxy)hexane, dicumyl peroxide, 4,4-di-tert-butylperoxy-n-butyl valerate, 1,1-di-tert-butylperoxy-3,3,5-trimethylcyclohexane and bis(tert-butylperoxyisopropyl)benzene. Details on the use of peroxidic vulcanizing agents are revealed by the company brochure "Rubbery Chemical-Crosslinking Peroxides" from Akzo-Chemie (publication date: April 1985). Suitable vulcanization activators for the vulcanization process include, for example, triallyl cyanurate (TAC) and acrylates such as ethylene glycol dimethacrylate (EDMA) and trimethylolpropane trimethacrylate (TRIM). TAC and/or EDMA are preferred.

Molded objects of rigid or rubber-elastic character can be prepared from the polyamide and rubber components in one or two steps. Of course, a key aspect of the invention is the preparation of a composite by bonding a body of a thermoplastic molding composition to a body of rubber.

In the two-step process, a thermoplastic molded object, prepared by compression molding, injection molding or extrusion, is coated with the optionally preformed rubber composition and then subjected to the vulcanization conditions of the rubber. The coating of the rigid molded object with the rubber can be effected by compression molding, injection molding or extrusion, wherein the choice of rubber with respect to the melt viscosity must depend on the shaping process selected.

In the two-step injection-molding process, a similar procedure is adopted as in the two-step production of two-color injection moldings. The insert used is a thermoplastic molded object. The cylinder and screw of the injection-molding machine are set out in a known manner for rubber processing, and the mold can be heated to the vulcanization temperature.

The optimum vulcanization conditions depend on the rubber mixture selected, in particular on its vulcanization system, and on the shape of the molded object to be prepared.

Suitable mold temperatures are between 140° and 200° C., preferably between 150° and 180° C. When PA materials having low heat distortion resistance are used, temperatures in the lower part of the ranges specified are selected. The vulcanization times are between 3 and 30 minutes, preferably between 5 and 20 minutes.

In the case of coating and vulcanizing by the two-step extrusion process, a PA material profile, for example a pipe, produced in the first step is, for example, covered with the rubber composition and vulcanized, if necessary under pressure. A corresponding procedure is adopted in the case of sheets, non-wovens, wovens and cables.

In the one-step injection-molding process, a procedure analogous to the one-step two-color injection-molding process is adopted. In this case, one injection-molding machine is equipped for thermoplastic processing, the other for rubber processing. The mold is heated to the pre-specified vulcanization temperature, which should be below the solidification point of the PA material.

The following are examples of articles which can be produced from the compositions subjected to vulcanization: rubber-coated rolls and flanges; pipe and tube connections, sealing frames, shock- and radiation-absorbent components, spring elements; vibration absorbers, PA-reinforced rubber profiles; conveyor belts, drive belts, pinch rollers for video and audio tape machines; gaskets, in particular shaft seals, castors, clutch and brake disks, membranes, pistons with piston rings, reinforced bellows, pump housings and pump valves.

The following are examples of nylon polyamide molding compositions:

A-1) VESTAMID ® X 4887:Polyamide 12 is obtained by polycondensation of laurolactam and subsequent termination of the reaction using hexamethylenediamine. The $NH_2$:COOH terminal group ratio is 5:1. The relative solution viscosity is 1.9, measured in m-cresol at a concentration of 0.5 g of polyamide/100 ml.

A-2) VESTAMID ® L 1901:Polyamide 12 is obtained by polycondensation of laurolactam and subsequent termination of the reaction using dodecanedioc acid. The $NH_2$:COOH terminal group ratio is 1:2. Otherwise, the properties of this product correspond to those of VESTAMID ® X 4887.

A-3) VESTAMID ® L 2032:This is a glass fibre-reinforced PA 12 which additionally contains anti-ageing agent and mold-release agent. The $NH_2$:COOH terminal group ratio is 1:1.7.

A-4) VESTAMID ® X 1852:This is a PA 12 having a relative solution viscosity of 2.1, measured in m- cresol at a concentration of 0.5 g of polyamide/100 ml. The NH$_2$:COOH ratio is 1:2.

A-5) VESTAMID ® D 18:This is a PA 612 having a relative viscosity of 1.95. The NH$_2$:COOH group ratio is 10:1.

These are products of Huels Aktiengesellschaft. Further properties of these products are described in the product information sheet "VESTAMID ®" of October 1986.

Other polyamide compositions include:

A-6) VESTOBLEND ®:Polyamide/poly(phenylene ether) molding compositions are produced as described in DE-OS 3,615,393 by melting and mixing 30 to 95 percent by weight of a polyamide with 5 to 70 percent by weight of a poly(phenylene ether). This molding composition is a product of Muels AG. The properties of this product are given in the product information sheet "VESTOBLEND ®" 3083/12.87.

A-7) ULTRAMID ® A 5:This is a polyamide 66 manufactured by BASF. The properties of the product are given in the product range summary sheet "ULTRAMID ®", 1979.

A-8) ULTRAMID ® B 4:This is a polyamide 6 manufactured by BASF. The properties of the product are likewise given in the product range summary sheet "ULTRAMID ®", 1979.

A-9) NOVAMID ® EN 107 J:This product is a highly diamine-regulated PA manufactured by Mitsubishi Kasei, Tokyo, Japan. The NH$_2$:COOH terminal group ratio is about 22:1.

Examples of the rubber component of the present invention include the following:

B-1) EXXELOR VA 1803:This is a MSA-modified EPM rubber manufactured by Exxon Chemicals, Wilmington, Del., USA. The properties of the product are given in the technical information sheet "EXXELOR VA" of Jan. 3, 1988.

B-2) Experimental product X 4496:This product is obtained by MSA modification of BUNA AP 437 (EPDM). The properties are given in the product information sheet "BUNA ® AP", December 1980.

B-3) NX 775:This is a carboxyl group-containing NBR rubber manufactured by Goodyear Fire & Rubber, Akron, Ohio, USA. The properties of the product are given in the product information sheet "CHEMIGUM ® NX 775", November 1987.

B-4) HYCAR ®1472:This product is manufactured by BF Goodrich, Arnheim, The Netherlands. Its properties are given in the product summary sheet "HYCAR ®", October 1986.

In order to demonstrate the bonding action achieved in the present invention, test specimans are prepared by forming a plastic sheet from the thermoplastic PA-containing polymer as described in DIN 53 531, Part 1, coating of a third of this sheet with a Teflon film, placing a matching rubber web on the sheet, press molding the composite to achieve bonding of the layers, and finally cutting out the test speciman to a width of 25 mm.

The compositions of the rubbers are presented in Tables 1 and 3. The experimental results are shown in Tables 2 and 4. In principal, comparable values are obtained if the vulcanization activator is omitted.

TABLE 1

| Components of rubber compositions C-1 to C-7 | | | | | | | |
|---|---|---|---|---|---|---|---|
| Example | C-1 | C-2 | C-3 | C-4 | C-5 | C-6 | C-7 |
| Rubber B-1 | 100 | — | — | — | — | — | — |
| Rubber B-2 | — | 100 | 100 | — | — | — | — |
| Rubber B-3 | — | — | — | 100 | 100 | — | — |
| Rubber B-4 | — | — | — | — | — | 100 | 100 |
| Zinc oxide[1] | 5 | 10 | 5 | — | — | — | — |
| Aluminum silicate[2] | — | 140 | — | — | — | — | — |
| Juraperle 10 H[3] | — | 60 | — | — | — | — | — |
| Oil[4] | 60 | 50 | 60 | — | — | — | — |
| VULKASIL ® C[5] | — | — | — | — | 40 | — | 40 |
| Silane A 172[6] | 1.5 | 1.5 | 1.5 | — | — | — | — |
| VULKANOX ® HS[7] | 1.5 | 1.5 | 1.5 | — | — | — | — |
| DUREX ® O[8] | 100 | — | — | — | — | — | — |
| CORAX ® N 550[9] | — | — | 100 | 40 | — | 40 | — |
| TAC[10] | 1 | 1 | 1 | — | — | — | — |
| Perkadox 14/40[11] | 7.5 | 7.5 | 7.5 | — | — | — | — |
| EDMA[12] | — | — | — | 0.5 | 0.5 | 0.5 | 0.5 |
| Perkadox BC 40[13] | — | — | — | 3 | 3 | 3 | 3 |
| Stearic acid | — | — | — | 1 | 1 | 1 | 1 |

The numerical values are in parts by weight.
[1]The zinc oxide employed was more than 99% pure. The particle size was 0.8 to 1.0 mm.
[2]The aluminium silicate employed is a combined China clay, type POLESTAR ® 200 R manufactured by ECC International, St. Austell, Cornwall, Great Britain. The properties of the product are given in the company brochure.
[3]Juraperle 10 H is a filler manufactured by Wingertsberg Fuelistoff und Kreidewerk GmbH,D-5000 Cologne-Bayental.
[4]The paraffin oil used was Sunpar 150, a product of Sunoil Belgien LV, Antwerpen.
[5]Vulkasil C is a highly active silica. This product can be obtained from Bayer AG, D-5090 Leverkusen.
[6]Silane A 172 is a tradename for vinyltris(2-methoxy-ethoxy)silane.
[7]VULKANOX ® HS, an anti-aging agent manufactured by Bayer AG, D-5090 Leverkusen. This is 2,2,4-trimethyl-1,2-dihydroquinoline.
[8]DUREX ® O is a semi-reinforcing gas black manufactured by Degussa, D-6450 Hanau.
[9]CORAX ® N 550 is a product manufactured by Degussa, Hanau.
[10]TAC (triallyl cyanurate) is a product manufactured by Degussa, D-6450 Hanau.
[11]Perkadox 14/40 and Perkadox BC 40 are products obtained from Akzo-Chemie.
[12]EMDA (ethylene glycol dimethacrylate) is a product manufactured by Degussa, D-6450 Hanau.
[13]The peroxide employed was Perkadox BC 40, a product manufactured by Akzo-Chemie, The Netherlands.

TABLE 2

Properties of the composite materials according to the invention. Separation takes place in all cases cohesively, i.e. the test specimen does not crack at the plastic/rubber interface, but instead within the rubber component.

| Rubber | Polyamide material | Vulcanization temperature in °C. | Vulcanization time in min. | Separation force in N/mm |
|---|---|---|---|---|
| C-1 | A-1 | 160 | 25 | 17.0 |
|  | A-2 | 160 | 25 | 14.4 |
|  | A-5 | 180 | 15 | 13.9 |
|  | A-6 | 150 | 30 | 9.7 |
|  | A-7 | 180 | 15 | 17.4 |
|  | A-8 | 180 | 15 | 16.8 |
| C-2 | A-9 | 180 | 15 | 14.4 |
| C-3 | A-1 | 160 | 25 | 13.1 |
|  | A-4 | 160 | 25 | 12.7 |
|  | A-6 | 150 | 30 | 11.2 |
| C-4 | A-1 | 160 | 15 | 16.1 |
|  | A-9 | 180 | 10 | 10.9 |
| C-5 | A-1 | 160 | 15 | 16.2 |
|  | A-5 | 180 | 10 | 15.6 |
| C-6 | A-1 | 160 | 15 | 11.2 |
|  | A-2 | 160 | 15 | 10.0 |
|  | A-3 | 160 | 15 | 8.8 |
|  | A-4 | 160 | 15 | 8.8 |
|  | A-5 | 180 | 10 | 10.8 |
| C-7 | A-6 | 150 | 25 | 10.9 |
|  | A-9 | 180 | 10 | 10.7 |

TABLE 3

| Example | Components of rubber compositions | | | |
|---|---|---|---|---|
| | C-8 | C-9 | A | B |
| Rubber B-2 | 100.0 | — | 100.0 | — |
| Rubber B-3 | — | 100.0 | — | 100.0 |
| ZnO[1] | 10.0 | — | 5.0 | 5.0 |
| Aluminum silicate[2] | 140.0 | — | 140.0 | — |
| Juraperle 10 H[3] | 60.0 | — | 60.0 | — |
| Oil[4] | 50.0 | — | 50.0 | — |
| Silane A 172[6] | 1.5 | — | 1.5 | — |
| VULKANOX ® HS[7] | 1.5 | — | 1.5 | — |
| Perkadox 14/40[11] | 7.5 | — | — | — |
| Perkadox BC 40[11] | — | 3.0 | — | — |
| Activator TAC[10] | 1.0 | — | — | — |
| Activator ED MA[12] | — | 0.5 | — | — |
| Stearic acid | — | 1.0 | 1.0 | 1.0 |
| VULKANOX ® DDA[14] | — | — | 1.5 | — |
| VULKACIT ® LDB[15] | — | — | 1.5 | — |
| VULKACIT ® P extra N[15] | — | — | 0.8 | — |
| VULKACIT ® Mercapto[15] | — | — | 1.0 | — |
| TMTD 80[16] | — | — | 1.0 | — |
| Sulfur | — | — | 0.8 | 0.5 |
| VULKASIL ® C[5] | — | 40.0 | — | 40.0 |
| TMTD[16] | — | — | — | 3.0 |

The numerical values are in parts by weight.
Footnotes (1) to (13) - see Table 1.
[14]VULKANOX ® DDA is an anti-aging agent manufactured by Bayer AG. D-5090 Leverkusen. This is a styrenemodified diphenylamine (SDPA).
[15]The accelerators employed were VULKACIT ® P (zinc ethylphenyldithiocarbamate), VULKACIT ® LDB (zinc dibutyl dithiocarbamate) and VULKACIT ® Mercapto (mercaptobenzothiazole). These are products of Bayer AG. D-5090 Leverkusen
[16]TMTD (tetramethylthiuram disulfide) having the tradename RHENOGRAM ® TMTD 80 manufactured by Rheinchemie, D-4800 Mannheim.

TABLE 4

| Rubber | Polyamide | Adhesion in the peel test in N/mm |
|---|---|---|
| C-8 | A-1 | 14.6/15.4/13.2 |
| C-9 | A-1 | 15.0/15.5/18 |
| A | A-1 | 0* |
| B | A-1 | 0* |

*The rubber layer can be separated from the polyamide without applying force ("no bond").

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for bonding a nylon containing thermoplastic material and rubber, comprising:
   contacting a body of a thermoplastic component which contains at least 30% by wt. of a nylon and a body of a rubber composition which consists essentially of, based on 100 parts by wt. of a carboxyl group-containing rubber, 100-300 parts by wt. of fillers, and 1-10 parts by wt. of a peroxide as vulcanizing agent and vulcanizing the rubber body thereby achieving firm bonding of the contacting thermoplastic and rubber bodies.

2. The process of claim 1, wherein said rubber composition further comprises up to 4 parts by weight of vulcanization activators and extenders.

3. The process of claim 1, wherein the rubber composition contains, as the rubber component, a carboxylated EP(D)M or NBR rubber.

4. The process of claim 1, wherein said nylon is polyamide 46, polyamide 6, polyamide 66, polyamide 12, polyamide 612, polyamide 11, polyamide 610 or combinations thereof.

5. The process of claim 3, wherein said nylon is polyamide 46, polyamide 6, polyamide 66, polyamide 12, polyamide 612, polyamide 11, polyamide 610 or combinations thereof.

6. The process of claim 1, wherein the nylon contains COOH and $NH_2$ groups in the ratio 1:x where $100 > x > 1$.

7. The process of claim 1, wherein the thermoplastic contains up to 70 percent by weight of a poly(phenylene ether).

8. The process of claim 1, wherein said rubber composition contains additives which are zinc oxide, calcium carbonate, silica, carbon black, aluminium silicates or combinations thereof.

9. The process of claim 1, wherein the rubber composition additionally contains up to 150 parts by weight of plasticizer oils.

10. The process of claim 1, wherein the vulcanization is carried out at temperatures between 140° and 200° C. in 2 to 30 minutes.

11. The process of claim 10, wherein said vulcanization is conducted at a temperature of 150° to 180° C. in 5 to 10 minutes.

12. An object of rubber bonded to a nylon containing thermoplastic material as prepared by the process of claim 1.

* * * * *